United States Patent
Hermsen

(10) Patent No.: US 6,736,504 B1
(45) Date of Patent: May 18, 2004

(54) HINGELESS EYEGLASSES

(76) Inventor: James Hermsen, 5018 S. 18th St., Omaha, NE (US) 68107

( * ) Notice: Subject to any disclaimer, the term of this patent is extended or adjusted under 35 U.S.C. 154(b) by 0 days.

(21) Appl. No.: 10/426,132

(22) Filed: Apr. 29, 2003

(51) Int. Cl.⁷ .................................................. G02C 5/14
(52) U.S. Cl. .................... 351/116; 351/121; 351/156
(58) Field of Search ................................ 351/111, 114, 351/116, 117, 119, 121, 153, 156, 157, 41; 2/228; 16/228

(56) References Cited

U.S. PATENT DOCUMENTS

| | | | | |
|---|---|---|---|---|
| 2,660,092 A | * | 11/1953 | Bloom | 351/156 |
| 3,422,449 A | | 1/1969 | Rinnman | 351/121 |
| 3,574,452 A | | 4/1971 | McLendon et al. | 351/153 |
| 3,762,804 A | | 10/1973 | Livas | 351/90 |
| 4,202,609 A | * | 5/1980 | Reese | 351/111 |
| 4,391,498 A | | 7/1983 | Rengstorff | 351/121 |
| 4,564,272 A | * | 1/1986 | Rinnooy Kan | 351/153 |
| 4,781,450 A | | 11/1988 | Danloup et al. | 351/114 |
| 4,953,967 A | * | 9/1990 | Somerville | 351/136 |
| D328,908 S | * | 8/1992 | Kalbach | D16/123 |
| D349,123 S | * | 7/1994 | Cooley et al. | D16/309 |
| 5,452,029 A | | 9/1995 | Yang | 351/140 |
| 5,594,511 A | | 1/1997 | Lin | 351/116 |
| 5,652,637 A | | 7/1997 | Marini | 354/116 |
| 6,182,334 B1 | * | 2/2001 | Davancens | 24/3.3 |
| 6,238,048 B1 | | 5/2001 | Fukuoka | 351/114 |
| 6,276,794 B1 | * | 8/2001 | Chiang | 351/43 |
| D450,744 S | | 11/2001 | Rhoades et al. | D16/311 |
| 6,502,939 B2 | | 1/2003 | Vignato | 351/110 |

FOREIGN PATENT DOCUMENTS

WO    WO 01/71413 A2    9/2001

* cited by examiner

*Primary Examiner*—Huy Mai
(74) *Attorney, Agent, or Firm*—Thomte, Mazour & Niebergall; Shane M. Niebergall

(57) ABSTRACT

A frame assembly for eyeglasses is provided having removable and interchangeable securement members. The frame assembly is preferably provided with a lense frame having mounting holes formed in the opposite ends of the frame. A pair of mounting pins are provided to be removably secured within the mounting holes. In one embodiment, a cord member is secured at its opposite ends to the mounting pins and wraps around the user's head to secure the frame assembly in place. In another embodiment, a pair of arms are secured to the mounting pins and releasably secured within the mounting holes. The frame assembly eliminate the necessity for a hinge assembly and creates a durable and adjustable eyeglass assembly.

16 Claims, 2 Drawing Sheets

HINGELESS EYEGLASSES

BACKGROUND OF THE INVENTION

The present invention relates to eyeglasses, and more particularly to a novel frame assembly for eyeglasses having removable securement members that eliminate the necessity for securement member hinges and hinge supports.

DESCRIPTION OF THE PRIOR ART

Most people own at least one pair of eyeglasses. Regardless of whether the eyeglasses are to correct the individual's vision or to shield the individual's eyes from the sun, eyeglasses are ubiquitous. The typical pair of eyeglasses is comprised of a lense frame that houses a pair of lenses and is hingedly connected to a pair of "arms". The hinge assembly which connects the arms and the lense frame is typically comprised of a rigid mounting member that extends rearwardly from the lense frame and is coupled to a second receiving member using a pivot pin or screw. While this hinge assembly allows for the arms to be folded adjacent the lense frame for storage, the rigid connection between the arms and the lense frame creates a vulnerable structure that is frequently broken regardless of whether the eyeglasses are being worn or stored, typically within the individual's pocket or on the seat of the individual's automobile.

Frequent use of eyeglasses involves the moving of the arm members between their use and collapsed positions. Repeated movement of the arms in this manner often causes the screw or pivot pin to become lost or damaged. Regardless of whether the hinge member has been broken or the pivot member has been lost, damage to this fragile structure on the eyeglasses renders them unwearable. Moreover, the assembly and construction of this area of the frame assembly is oftentimes complex and expensive.

Accordingly, what is needed is a frame assembly for eyeglasses that eliminates the necessity for a hinge assembly while remaining capable of easy and convenient storage when the eyeglasses are not being worn.

SUMMARY OF THE INVENTION

The eyeglasses of the present invention are preferably provided with a lense frame having opposite and portions and a mounting hole formed within each of the opposite sides. A pair of mounting pins are provided with a size and shape to be releasably received within the mounting holes. In one embodiment an elongated cord member is provided having first and second ends. The first and second ends of the cord member can be disposed through the mounting holes of the lense frame from the rear. The mounting pins can then be coupled to the first and second ends of the cord and releasably secured within the mounting holes of the lense frame. In this embodiment the cord means the lense frame in a proper wearing position on the use's head. During temporary moments of non-use, the user can release th lense frame from his or her face and allow the eyeglasses to hang about his or her neck like a necklace.

In a second embodiment, a pair of eyeglass arms is provided, each having forward and rearward ends. The forward ends of the arms are shaped to be releasably coupled the mounting pins. Each arm assembly can then be "threaded" through the mounting holes from the front side of the lense frame. The mounting pins are then removably secured within the mounting holes, and the eyeglasses can be worn in a typical fashion. When the eyeglasses are to be stored, the user, simply reverse the process to remove the arms from the lense frame.

The first and second embodiments are interchangeable to provide the user with a plurality of wearing, options. Moreover, the hingeless mounting design creates a frame assembly that can be easily manufactured while decreasing the likelihood of being broken or otherwise rendered inoperable during day-to-day use.

It is therefore a principal object of the invention to provide a frame assembly for eyeglasses having a hingeless-design.

A further object of the Invention is to provide a frame assembly for eyeglasses having removable securement members for supporting the lense frame on the face of a user.

Yet another object of the invention is to provide a frame assembly for eyeglasses having a plurality of different types of securement members that are interchangeable with one another to provide different frame assemblies for different intended uses.

Still another object of the invention is to provide a frame assembly for eyeglasses that reduces the incidence of frame breakage.

Yet another object of the invention is to provide a frame assembly for eyeglasses that is relatively simple and inexpensive to manufacture.

A further object of the invention is to provide a frame assembly for eyeglasses that is adjustable for use with a plurality of different users having different physical dimensions and characteristics.

These and other objects will be apparent to those skilled in the art;

DESCRIPTION OF THE PREFERRED EMBODIMENT

Figure 1:
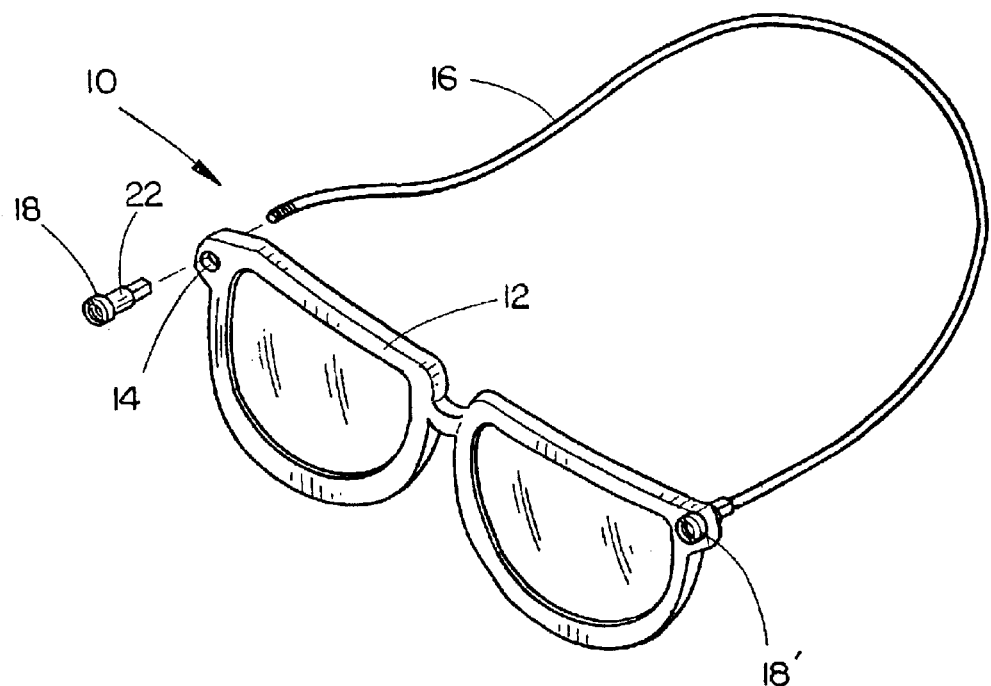
FIG. 1 is a perspective view of a first embodiment of the frame assembly of the present invention.
Figure 2:
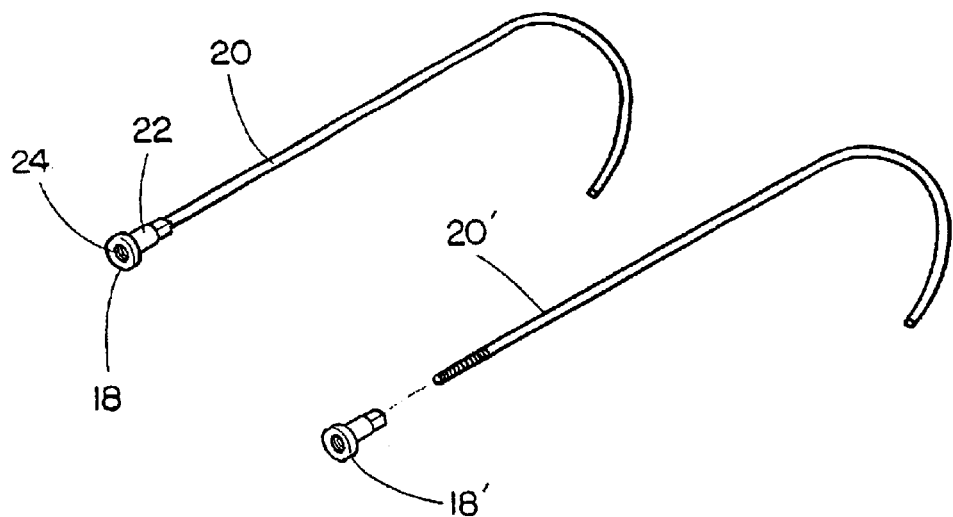
FIG. 2 is a perspective view of one embodiment of a pair of securement members that can be used as a component of the frame assembly of the present invention.
Figure 3:
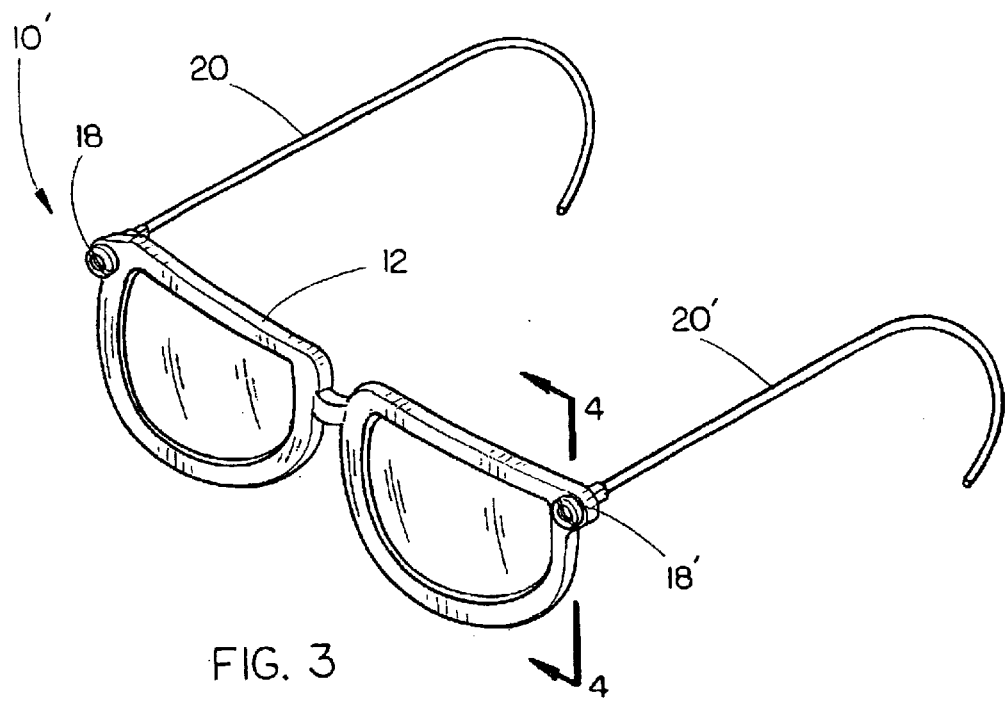
FIG. 3 is a perspective view of a second embodiment of the frame assembly of the present invention.
Figure 4:
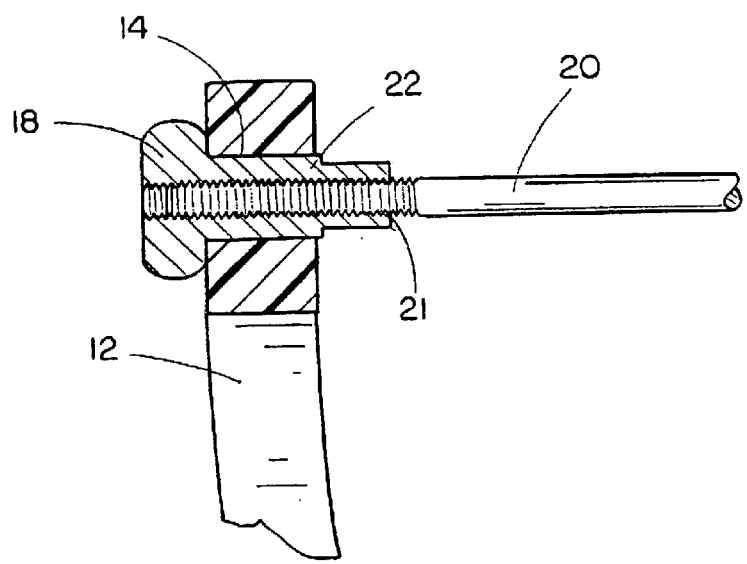
FIG. 4 is a partial cutaway view of the mounting assembly of one embodiment of the present invention.

The numeral 10 refers generally to the frame assembly for eyeglasses of the present invention, as shown generally in FIGS. 1–4. The frame assembly 10 is preferably provided with a lense frame 12. It will be clear to those of skill in the art that nearly any shape or style of lense frame 12 can be incorporated with the present invention without departing from the spirit of the same. Accordingly, the general shape and style of the lense frame 12 depicted in the accompanying figures is provided for example purposes only and is not intended to limit the scope of the present invention. The lense frame 12 should be provided with at least one, but preferably two or more, mounting holes 14. The mounting holes 14 are preferably formed in the opposite end portions of the lense frame 12, as depicted In FIG. 1.

The frame assembly 10 is preferably provided with a securement member for positioning the lense frame 12 closely adjacent the eyes of the user. In one embodiment, an elongated cord 16 provides a securement member that generally wraps around the user's head and is coupled to the lense frame 12 at its mounting holes 14 using a pair of mounting pins 18. The mounting pins 18 are secured to the opposite ends of the cord 16 and then disposed within the mounting holes 14. In one embodiment, the mounting pins 18 are provided with an open recess 21 that is formed at the free end of the shaft 22. It is preferred that the open recess 21 be provided with threaded mating members 24 to securely engage the free end of the securement member. Where the cord 16 is used as the securement member, it is preferred that the cord be formed from a flexible material, such as plastic, rubber, nylon or other similar material. Such materials not only provide for the desired flexibility of the cord 16 but also allow the mating threads 24 of the mounting pins 18 to "bite" into the opposite ends of the cord 16 as the mounting pins 18 are threaded thereon. Where a mounting pin 18 is not provided with mating threads 24 within the open recess 21, it will be preferred that the cord 16 have a sufficient diameter to press-fit or frictionally engage within the open recess 21. While it is envisioned that the cord 16 could be permanently secured within the open recess 21 of the mounting pin 18 using an adhesive or the like, it is preferred that the same be releasably coupled to one another. In still another embodiment, the shaft 22 of the mounting pin 18 could be provided with a narrow diameter and mounting threads on its exterior surface so that the mounting pin 18 could be threaded into the end of cord 16.

The cord 16 can be coupled with the lense frame 12 in a number of different ways. In a preferred embodiment, the two opposite ends of the cord 16 are first disposed through the mounting holes 14 of the lense frame 12 from the rear of lense frame 12. The mounting pins 18 are then coupled to the opposite ends of cord 16. The mounting pins 18 can then be press-fit or frictionally engaged with the inner diameter of the mounting holes 14. To the extent that this mounting option is desired, the diameters of the shaft 22 and the diameter of mounting hole 14 should be apportioned accordingly. It is also contemplated that the inner diameter of mounting hole 14 as well as the outer surface of the shaft 22 of mounting pin 18 could be provided with mounting threads to threadably secure the structures to one another. Although it is contemplated that the mounting pin 18 could be permanently set within the mounting hole 14 using an adhesive or other such method, it is preferred that the mounting pin 18 be releasably secured within the mounting hole 14. In an alternate method of mounting the cord 16, a single mounting pin 18 is secured to one end of the cord 16. The remaining free end of the cord 16 is then threaded through one of the mounting holes 14 from the forward side of the lense frame 12. The free end of the cord 16 can then be disposed through the remaining mounting hole 14 and the mounting pin 18 secured to the cord 16 and the mounting hole 14 as described previously.

The mounting cord 16 provides not only the necessary support for the user to wear the eyeglasses but also provides a means for temporary non-use. Where the user desires to remove the eyeglasses, but use an again in the near future, the lense frame 12 can be moved downwardly in front of the user's face and the cord 16 can be moved over the user's ears and down around the user's neck. In this position, the frame assembly 10 can remain around the user's neck, much like a necklace, until the time for future use has arrived.

For storage, the cord 16 can be removed from the lens frame 12. However, the flexible nature of the cord 16 permits the same to be bent and folded anywhere along its length so that the frame assembly 10 assumes a slim profile to be disposed within a pocket, glasses case, etc. This embodiment clearly provides a benefit over the prior art, having hinges and rigid hinge mounting structures, which are frequently broken or otherwise damaged during non-use.

The elongated securement member of the present invention may also be provided in the form of a pair of arm members 20. Although a pair of arm members is preferred, it is contemplated that a single arm member 20 could be used to support the lense frame 12 closely adjacent the use's face. The arm member 20 is preferably comprised of a semi-flexible material, which permits the shaping of the arm member by the user to better conform the arm member with the user's physical features. It is further preferred, however, that the material used to form the arm member be sufficiently rigid to substantially retain the shape that the user has formed. Many lightweight materials from copper, aluminum, tin and various blends thereof, as well as several plastics and nylon plastic blends, would suffice for these purposes. The rearward end of the arm member 20 is preferably shaped to engage the upper and rearward surfaces of the user's ear when the eyeglasses are being worn. However, any shape, including one which is straight, are contemplated. The forward end of the arm member 20 is shaped to be secured to the mounting pin 18, much in the same manner as the ends of cord 16. Accordingly, where a mounting pin 18 is provided with an open recess 21 having mating threads 24, the forward end of the arm member 20 should be appropriately threaded to engage the mounting pin 18. However, where no mating threads 24 are provided, the diameter of the forward end of the arm member 20 should be formed to appropriately press-fit or frictionally engage within the open recess 20. It is also contemplated that, where a narrow diameter shaft 22 is provided on the mounting pin 18 and mating threads are provided on the surface thereof, an open-threaded recess could be formed within the forward end of the arm member 20 to threadably receive the mounting pin 18 accordingly.

The arm members 20 can be coupled to the lense frame 12 in several different ways. Preferably, the mounting pin 18 is secured to the forward end of the arm member 20 as described hereinabove. The rearward end of the mounting arm 20 can then be "threaded" through the mounting hole 14 from the forward side of the lense frame 12 until the mounting pin 18 is secured within the mounting hole 14. It is also contemplated that the forward end of the mounting arm 20 could be inserted though the mounting hole 14 from the rearward side of the lense frame 12, where the mounting pin 18 could be secured thereto and then secured within the mounting hole 14. As discussed hereinabove, the mounting pin 18 is preferably press-fit or frictionally engaged within the mounting hole 14 to retain the removable nature of the structure. This could also be accomplished using mating threads or other such securement structures. For a desired application, the mounting pin 18 could be permanently secured within the mounting hole 14 using an adhesive or the like.

When the arm members 20 are to be moved from their use position to a collapsed position, the mounting pin 18 is uncoupled from mounting hole 14, and the arm members 20 are moved in a forward direction out of the mounting holes 14. In this collapsed position, the frame assembly 10 can be easily stored in a pocket or carrying case. As with the previously described embodiment, this embodiment provides an assembly that is less likely to be broken than those prior art frame assemblies having hinges and hinge mounting structures. Moreover, the reduction of the number of such complex component parts greatly reduces the cost as well as the complexity of manufacture. Moreover, the coaxial mounting nature of the mounting pin 18 to either of the elongated securement members provides for a mechanically strong structure that is easy to manufacture when compared to the "wrap-around" hinge mounting structure of the prior art.

In the drawings and in the specification, there have been set forth preferred embodiments of the invention; and although specific items are employed, these are used in a generic and descriptive sense only and not for purposes of limitation. Changes in the form and proportion of parts, as well as substitute of equivalents, are contemplated as circumstances may suggest or render expedient without departing from the spirit or scope of the invention as further defined in the following claims.

Thus it can be seen that the invention accomplishes at least all of its stated objectives.

I claim:

1. A frame assembly for eyeglasses, comprising:

a lense frame having opposite end portions and mounting holes formed within said opposite end portions;

a plurality of mounting pins having forward and rearward end portions; said rearward end portion being sized and shaped to be releasably received within said mounting holes; and at least one elongated securement member having first and second ends;

said at least one elongated securement member being coupled in a coaxial manner with at least one of said mounting pins so that the at least one elongated securement member can be operatively removably coupled to said lense frame for supporting the eyeglasses on the head of a user.

2. The frame assembly of claim 1 wherein said plurality of mounting pins are sized to be frictionally secured within said mounting holes.

3. The frame assembly of claim 1 wherein the second end of said elongated securement member is shaped to engage an ear of a user to support the eyeglasses on the user's head.

4. The frame assembly of claim 1 wherein the mounting pins are formed with openings in the rearward end portions for receiving the first end of said at least one elongated securement member.

5. A frame assembly for eyeglasses, comprising:

a lense frame having opposite end portions and mounting holes formed within said opposite end portions;

at least one elongated securement member having first and second ends; and means for removable securing said at least one elongated securement member into the mounting holes of said lense frame so that the eyeglasses can be worn by a user.

6. The frame assembly of claim 5 wherein said at least one elongated securement member is formed from a flexible material so that the first and second ends of said at least one elongated securement member can be operatively coupled to the mounting holes formed within the opposite end portions of said lense frame.

7. The frame assembly of claim 6 wherein said at least one securement member is selectively sized and shaped by the user to permit the eyeglasses to be worn around the neck of the user.

8. The frame assembly of claim 5 wherein the second end of said elongated securement member is shaped to engage an ear of a user to support the eyeglasses on the user's head.

9. The frame assembly of claim 5 wherein said at least one securement member is formed from a material that is sufficiently flexible to permit the user to selectively shape said at least one securement member and customize a position in which the eyeglasses are worn by the user.

10. The frame assembly of claim 9 wherein the material from which said at least one securement member is formed is sufficiently rigid to substantially remain in the shape selected by the user.

11. The frame assembly of claim 5 wherein said at least one securement member is selectively removably coupled to said means for securing said at least one elongated securement member to said lense frame.

12. A frame assembly for eyeglasses, comprising:

a lense frame having opposite end portions and mounting holes formed within said opposite end portions;

a plurality of mounting pins having forward and rearward end portions; said rearward end portion being sized and shaped to be releasably received within said mounting holes; and at least one elongated securement member having first and second ends;

said at least one elongated securement member being formed from a flexible material so that the first and second ends of said at least one elongated securement member can be coupled to said plurality of mounting pins and operatively removably secured to the mounting holes within the opposite end portions of said lense frame;

said at least one elongated securement member being coupled in a coaxial manner with at least one of said mounting pins so that the at least one elongated securement member can be operatively removably coupled to said lense frame for supporting the eyeglasses on the head of a user.

13. The frame assembly of claim 12 wherein said plurality of mounting pins are provided with mounting threads that are selectively engageable with the flexible material of said at least one elongated securement member to releasably secure said mounting pins to the first and second ends of said at least one elongated securement member.

14. A frame assembly for eyeglasses, comprising:

a lense frame having opposite end portions and mounting holes formed within said opposite end portions;

a plurality of mounting pins having forward and rearward end portions; said rearward end portion being sized and shaped to be releasably received within said mounting holes; said plurality of mounting pins being formed with openings in the rearward end portions for receiving the first end of said at least one elongated securement member; and at least one elongated securement member having first and second ends;

said openings of said plurality of mounting pins and the first end of said at least one elongated securement member being provided with mating threads for removably securing the first end of said at least one elongated securement member within the opening of one of said mounting pins;

said at least one elongated securement member being coupled in a coaxial manner with at least one of said mounting pins so that the at least one elongated securement member can be operatively removably coupled to said tense frame for supporting the eyeglasses on the head of a user.

15. The frame assembly of claim 14 wherein the first end of said at least one elongated securement member is shaped to be frictionally engaged within the openings of said mounting pins.

16. A frame assembly for eyeglass, comprising:

a lense frame having opposite end portions and mounting holes formed within said opposite end portions;

a plurality of mounting pins having forward and rearward end portions; said rearward end portion being sized and shaped to be releasably received within said mounting holes; said plurality of mounting pins being formed with openings in the rearward end portions for receiving the first end of said at least one elongated securement member; and at least one elongated securement member having first and second ends; said first end of said at least one elongated securement member being shaped to be frictionally engaged within the openings of said mounting pins;

said at least one elongated securement member being coupled in a coaxial manner with at least one of said mounting pins so that the at least one elongated securement member can be operatively removably coupled to said lense frame for supporting the eyeglasses on the head of a user.

* * * * *